United States Patent [19]

Price et al.

[11] Patent Number: 5,867,534
[45] Date of Patent: Feb. 2, 1999

[54] OPTICAL TRANSMISSION METHOD WITH REDUCED SENSITIVITY TO DISPERSION, TRANSMISSION DEVICE AND SYSTEM FOR IMPLEMENTING THIS METHOD

[75] Inventors: Alistair Price, Thousand Oaks, Calif.; Roland Uhel, Clohars Carnoet, France

[73] Assignee: Alcatel Cit, Paris, France

[21] Appl. No.: 557,184

[22] PCT Filed: Apr. 20, 1995

[86] PCT No.: PCT/FR95/00510

§ 371 Date: Dec. 13, 1995

§ 102(e) Date: Dec. 13, 1995

[87] PCT Pub. No.: WO95/29539

PCT Pub. Date: Nov. 2, 1995

[30] Foreign Application Priority Data

Apr. 20, 1994 [FR] France ............................ 94 04732

[51] Int. Cl.[6] ....................................... H04L 25/34
[52] U.S. Cl. .................. 375/286; 375/289; 359/185; 359/246
[58] Field of Search .................... 375/286, 289, 375/295; 359/180, 181, 184, 185, 246, 238, 276, 281

[56] References Cited

U.S. PATENT DOCUMENTS

| | | | |
|---|---|---|---|
| 4,922,249 | 5/1990 | Cointot et al. | 375/289 |
| 5,144,669 | 9/1992 | Faulkner et al. | 375/367 |
| 5,623,518 | 4/1997 | Pliffner | 375/278 |

OTHER PUBLICATIONS

Gu et al, "10 Gbit/s unrepeatered three–level optical transmission over 100 km of standard fibre", *Electronics Letters*, vol. 29, No. 5, Dec. 09, 1993, Stevenage, GB, pp. 2209–2211.

Vodhanel et al. "10 Gbit/s modulation performance of distributed feedback lasers for optical fibre communication systems", *IEEE Global Telecommunications Conference*, vol. 3, Dec. 1990, San Diego, pp. 1534–1540.

*Patent Abstracts of Japan* vol. 13, No. 113 (E–729) 17 Mar. 1989 corresponding to JP,A,63 284 957 (Mitsubishi) dated Nov. 22, 1988.

*Primary Examiner*—Don N. Vo
*Attorney, Agent, or Firm*—Sughrue, Mion, Zinn, Macpeak & Seas, PLLC

[57] ABSTRACT

An optical transmission method and device consisting of coding a binary data pattern (SI) to be transmitted in the form of a second binary signal (SM), by differential coding; filtering the second binary signal (SM) to obtain a duobinary signal (SMF having three meaningful values ($-1$, $0\pm\epsilon$, $+a$) and a narrower bandwidth; and modulating an optical carrier according to the values assumed by the filtered signal (SMF), the modulated carrier having a maximal amplitude to represent the maximal value ($+a$) and the minimal value ($+a$) of the duobinary signal (SMF), the phase of the modulated carrier being shifted by $\theta_1$ and $\theta_2=\theta_1+180°$, respectively, and a minimal amplitude to represent values ($0\pm\epsilon$) near 0 if the duobinary signal. The method of this invention is suitable for long distance fiber-optic transmissions.

10 Claims, 3 Drawing Sheets

OPTICAL TRANSMISSION METHOD WITH REDUCED SENSITIVITY TO DISPERSION, TRANSMISSION DEVICE AND SYSTEM FOR IMPLEMENTING THIS METHOD

BACKGROUND OF THE INVENTION

The invention concerns a fiber optic transmission method having reduced sensitivity to chromatic dispersion caused by the fiber; a transmission device and system for implementing this method.

The maximal transmission distance over a repeaterless optical fiber is limited by attenuation and chromatic dispersion. Erbium-doped optical fiber amplifiers can correct the attenuation but the chromatic dispersion remains a major limitation in the case of signals having a high bit rate, for example 10 Gbit/s. Various prior art methods can compensate chromatic dispersion on a given fiber section, at least in part.

Other prior art methods are directed to making the transmission less sensitive to chromatic dispersion, without changing the latter. For example, the article "10 Gbit/s unrepeated three-level optical transmission over 100 km of standard fibre" by X. Gu and L. C. Blanck published in Electronics Letters, 9th Dec. 1993, vol. 29, n° 25, describes a method consisting of:

encoding a data pattern to be transmitted in the form of a duobinary signal, i.e. a signal which can assume values approximately equal to +1, 0 and −1, by reducing the bandwidth of a binary signal;

modulating an optical carrier with the values assumed by this signal, to obtain an amplitude modulated carrier at three different levels;

transmitting the modulated carrier over an optical fiber without using any particular method of compensating chromatic dispersion;

demodulating the optical signal received at the distant end of the optical fiber using a photoreceiver supplying an electrical signal representative of the amplitude of the received optical signal, and comparing this signal with two reference values to reconstitute two binary signals in parallel; and decoding the two binary signals to restore the data pattern.

The use of duobinary coding and amplitude modulation reduces the bandwidth occupied by the signal transmitted. This reduces the effect of chromatic dispersion and therefore significantly increases the maximal transmission distance. Another advantage is that the optical transmitter and optical receiver can have a narrower bandwidth than in the case of conventional transmission in which the carrier is amplitude modulated by a binary signal.

However, this prior art method has a drawback: it is necessary to discriminate three different amplitude levels in the electrical signal supplied by the photodetector. Discriminating three levels is much more difficult than discriminating two levels as required for amplitude modulation by a binary signal. Also, the signal/noise ratio is lower than that which would be obtained with a binary signal.

SUMMARY OF THE INVENTION

An object of the invention is to propose an optical transmission method which is less sensitive to chromatic dispersion but in which demodulation is easier.

The invention consists in an optical transmission method having reduced sensitivity to dispersion, wherein:

a data pattern is coded in the form of a ternary modulation signal which can assume three meaningful values: a maximal value, a minimal value and an intermediate value between the maximal value and the minimal value; and an optical carrier is modulated according to the values assumed by the modulation signal;

characterized in that, to modulate said carrier, the carrier is transmitted with:

a maximal amplitude to represent the maximal value and the minimal value of the filtered modulation signal, the phase of the modulated carrier being shifted approximately 180° in one case relative to the other; and a minimal amplitude to represent the intermediate value of the modulation signal;

and in that, to demodulate the modulated optical carrier, two levels are discriminated in the envelope of the power of the modulated carrier and the data pattern transmitted is deduced therefrom.

The above method has reduced sensitivity to chromatic dispersion because the bandwidth of the signal transmitted is reduced by coding it in the form of a ternary signal as compared with conventional amplitude modulation by a binary signal. For example, it enables transmission over distances exceeding 150 km at 10 Gbit/s on a fiber having a chromatic dispersion of 17.5 ps/nm.km. It also has the advantage of facilitating implementation of the optical carrier demodulator means since demodulation concerns only the amplitude and consists in discriminating only two distinct levels. Finally, the signal/noise ratio is better than in the situation where demodulation consists in discriminating three levels.

In a preferred embodiment of the invention, to code a data pattern to be transmitted in the form of a ternary signal:

the data pattern is coded in the form of a binary signal if it is not already in this form;

this binary signal is coded in the form of another binary signal by differential coding; and this other binary signal is filtered to reduce its bandwidth and thereby obtain a ternary signal.

In another embodiment of the invention, to code a data pattern to be transmitted in the form of a ternary signal:

the data pattern is coded in the form of a ternary signal with three discrete levels; and the ternary signal with three discrete levels is then optionally filtered to reduce its bandwidth further.

In another aspect the invention consists in a transmission device for implementing the method of the invention, including:

means for coding a data pattern to be transmitted in the form of a ternary modulation signal which can assume three meaningful values: a minimal value, a maximal value and an intermediate value between the maximal value and the minimal value; and means for modulating an optical carrier according to the values assumed by the modulation signal;

and characterized in that the optical carrier modulator means include a modulator supplying a modulated carrier having:

a maximal amplitude when the modulation signal has its maximal value or its minimal value, the phase of the modulated carrier being shifted approximately 180° in one case relative to the other; and a minimal amplitude when the modulation signal has its intermediate value.

In a preferred embodiment of the invention the means for coding a data pattern to be transmitted in the form of a ternary signal include:

means for coding said data pattern in the form of a binary signal if it is not already in this form;

means for coding the binary signal in the form of another binary signal by differential coding; and means for filtering the other binary signal to reduce its bandwidth and thereby to obtain a ternary signal.

In another embodiment of the invention the coding means include:

means for coding said data pattern in the form of a ternary signal with three discrete levels if it is not already in this form; and optional means for filtering the ternary signal by reducing its bandwidth.

In a further aspect the invention consists in a transmission system including:

a transmitter device for modulating an optical carrier with a data pattern;

an optical transmission link one end of which is coupled to an output of the transmitter device;

means for demodulating the modulated optical carrier having an input coupled to a second end of the link and supplying a signal representing the envelope of the power of the modulated optical carrier; and a comparator for comparing the signal to a reference value and deducing a binary signal representing the data pattern transmitted;

characterized in that it includes a transmitter device in accordance with the invention.

BRIEF DESCRIPTION OF THE DRAWINGS

The invention will be better understood and other features of the invention will emerge from the description given below and the accompanying drawings.

DETAILED DESCRIPTION OF THE INVENTION

Figure 1:
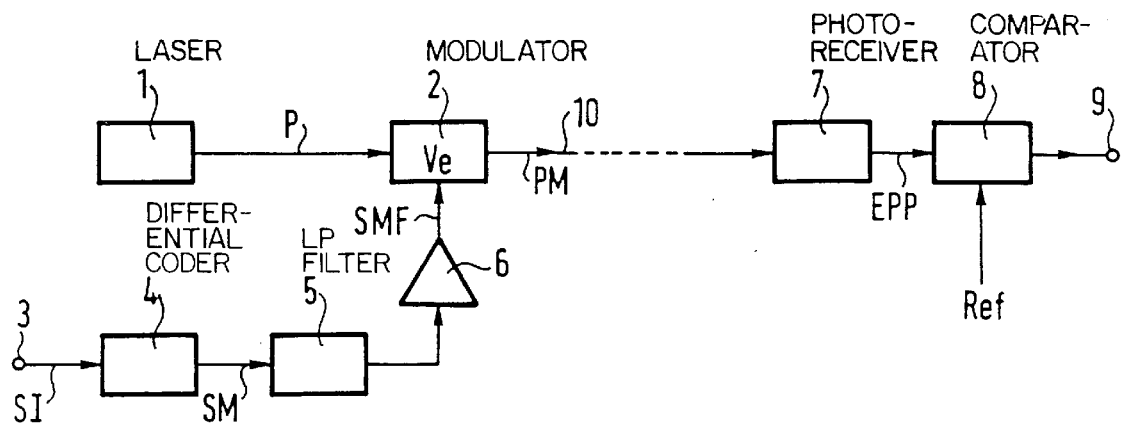
FIG. 1 is the block diagram of one embodiment of the transmission system of the invention.

FIG. 1 is the block diagram of one embodiment of the optical transmission system of the invention, for implementing the method of the invention. This embodiment includes:

a laser 1 emitting a constant amplitude carrier P;

a Mach-Zehnder type modulator 2 receiving the carrier supplied by the laser 1 and supplying a modulated carrier PM modulated according to the value Ve applied to a control input;

a fiber optic transmission link 10 connected to the output of the modulator 2;

an input 3 to which a data pattern SI is applied, the data pattern SI comprising a series of binary values in this example;

a differential coder 4 having an input connected to the input 3 and an output supplying another binary modulation signal SM representing the data pattern SI, the bandwidth of the signal SM being equal to 0.44 times the binary data rate of the signal SM;

a lowpass filter 5 having an input connected to the output of the coder 4 and a bandwidth equal to 0.3 times the binary data rate of the signal SM; it supplies at its output a filtered modulation signal SMF which is a duobinary signal having a reduced bandwidth equal to 0.25 times the binary data rate of the signal SM, so reducing the sensitivity to dispersion;

an amplifier 6 having an input connected to an output of the filter 5 and an output supplying a signal SMF to the control input of the modulator 2, the signal SMF being the modulation signal SM filtered by the filter 5 and amplified by the amplifier 6;

a photoreceiver 7 coupled to the end of the link 10 and the function of which is to supply an electrical signal EPP proportional to the envelope of the optical power received, independently of the phase; and a comparator 8 having an input connected to an output of the photoreceiver 7 and an input receiving a reference value Ref and the function of which is to compare the value of the signal EPP supplied by the photoreceiver 7 with this reference value and to deduce accordingly a binary signal which is supplied at an output 9, this binary signal being identical to the data pattern SI without any further decoding being required.

Figure 2:
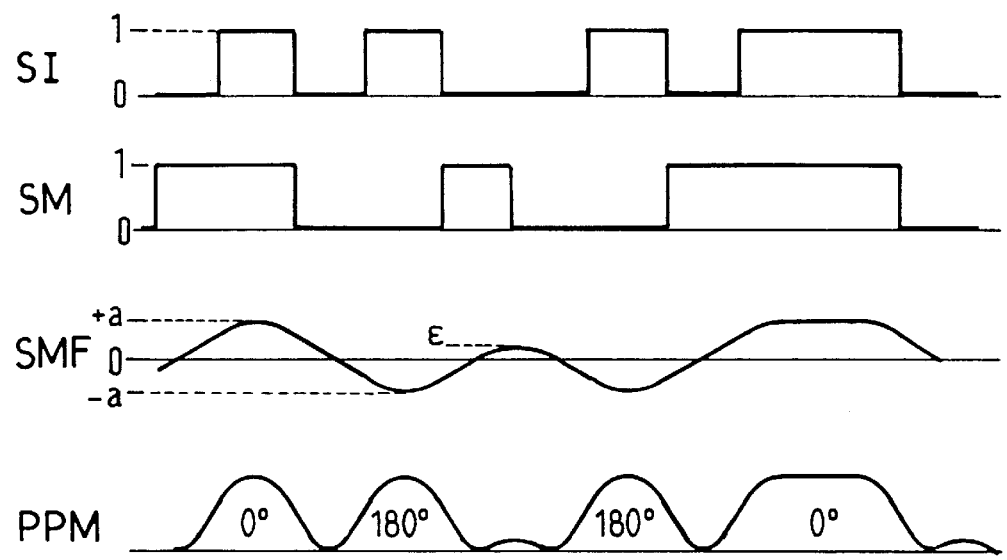
FIGS. 2 and 3 are timing diagrams illustrating two embodiments of the method of the invention.

FIG. 2 shows by way of example the timing diagrams of:

a data pattern SI made up of the binary values 0 1 0 1 0 0 1 0 1 1 0 0;

the modulation signal SM obtained by differential binary coding such that a 0 causes a transition and a 1 does not cause any transition;

the amplified filtered modulation signal SMF corresponding to this signal SM, the signal SMF having three significant values: $-a$, $0\pm\epsilon$, $+a$; and the envelope PPM of the power of the modulated carrier PM, with the values of the phase-shift applied to the modulated carrier.

In one embodiment of the invention a modulation signal can be obtained by ternary coding using three discrete levels. Before any filtering, this modulation signal occupies a bandwidth which is narrower than that of the original binary signal. An optional filter can further reduce the bandwidth. If the data pattern to be transmitted is not in binary form, ternary coding can be effected directly without using binary coding first.

Figure 3:
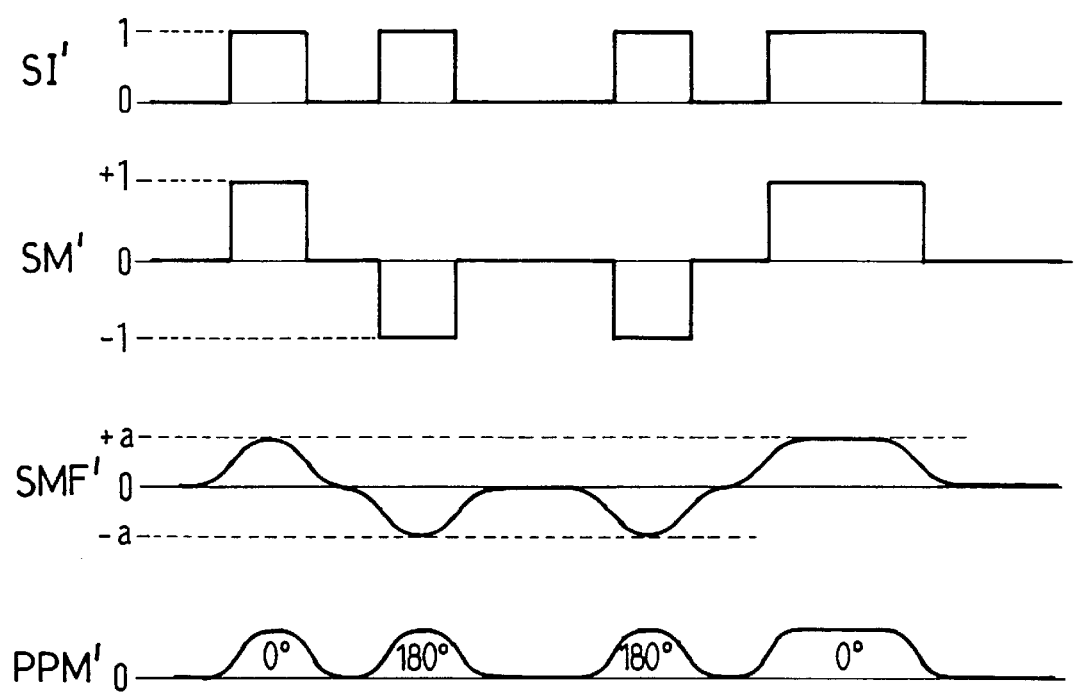

FIG. 3 illustrates this embodiment by reproducing, by way of example, the timing diagrams of:

a data pattern SI' to be transmitted made up of the binary values 0 1 0 1 0 0 1 0 1 1 0 0;

the steep-sided modulation signal SM' obtained by ternary coding with three discrete values, $-1$, $0$, $+1$;

the filtered modulation signal SMF' corresponding to this signal SM', the signal SMF' having three meaningful values $-a$, $0\pm\epsilon$, $+a$ and very rounded sides; and the envelope PPM' of the power of the modulated optical carrier, with the values of the phase-shift applied to the modulated carrier.

In this example, the ternary coding is applied in accordance with the rule that a 0 is represented by 0 and a 1 is represented by +1 or by $-1$, with no direct transition from +1 to $-1$ or vice versa, i.e. there is always a 0 between +1 and $-1$ or between $-1$ and +1. There are various ways to alternate +1 and $-1$ to represent 1. For example, there can be a change of sign if there is an odd number of 0's between two 1's and no change of sign if there is an even number of 0's between two 1's.

The bandwidth occupied by a ternary signal SM' of this kind is equal to 0.22 times the binary data rate of the data pattern SI'. Optional filtering can further reduce the bandwidth occupied by the ternary signal SM'. The bandwidth of the filter can be equal to 0.6 times the binary data rate of the binary signal SI', for example. The value of this bandwidth is not critical.

The filtered modulation signal SMF' does not have the steep sides of the ternary signal SM', but assumes three distinct values −a, 0, +a respectively corresponding to the values −1, 0 and +1 of the ternary signal SM'. Because of interference between successive symbols, these three distinct values fluctuate in the vicinity of the three values −a, 0, +a which are deemed to be meaningful values to represent −1, 0, +1.

Any other known partial response coding method can be used to obtain a modulation signal having three meaningful values.

The block diagram shown in FIG. 1 is suitable for implementation of this embodiment of the invention. Only the coder 4 and the bandwidth of the filter 5 are changed. Instead of being applied by a filter 5, filtering can be applied by the amplifier 6 or the modulator 2 if their bandwidth is less than the bandwidth of the signal SM'.

The envelope PPM (or PPM') of the power of the modulated carrier is maximal when the modulation signal SM (or SM') is equal to +1 or −1 and is minimal, null or near 0 when the modulation signal SM (or SM') is equal to 0. The modulator 5 delays the carrier in all cases, but shifts its phase differently according to the sign of the filtered modulation signal SMF (or SMF') which corresponds to the sign of the unfiltered modulation signal SM (or SM'). In the two examples described with reference to FIGS. 2 and 3, a positive sign of the signal SMF (or SMF ') is represented by a phase-shift θ1 and a negative sign is represented by a phase-shift θ2=θ1+180°. Any other pair of phase values can be used, provided that the difference between the two values is approximately equal to ±180°.

Two conditions are sufficient for demodulation to reconstitute a binary signal representative of the data pattern transmitted: the maximal value and the minimal value of the modulation signal applied to the modulator must represent the same binary value representing an information unit of the data pattern to be transmitted (1 in this example); and the intermediate value must represent the complementary binary value (0 in this example).

If these conditions are satisfied, it is possible to obtain a binary signal representing the data pattern transmitted by comparing the envelope of the power of the received signal with a threshold value. It may be necessary to decode this binary signal if the data pattern transmitted was not in binary form prior to differential coding or ternary coding. If M-ary symbols are coded directly in differential binary, for example, binary/M-ary transcoding is required to reconstitute the data pattern in its original format.

Figure 4:
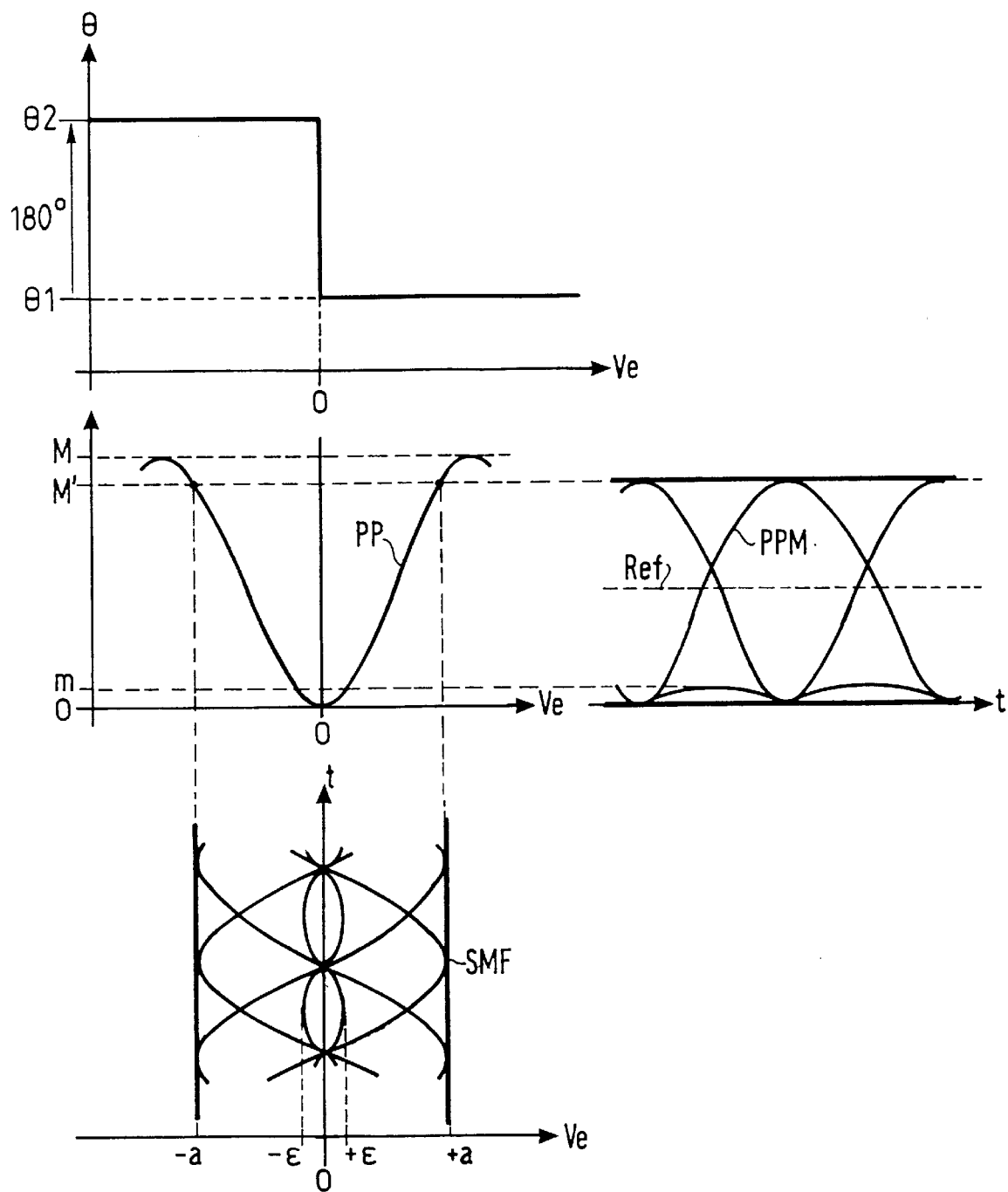
FIG. 4 is a timing diagram illustrating the operation of the modulator means when they comprise a Mach-Zehnder type modulator.

FIG. 4 illustrates the operation of the Mach-Zehnder type modulator 2. It shows:

the graph as a function of time t of the amplified and filtered modulation signal SMF, the value Ve of which controls the modulator 2;

the graph as a function of the value Ve of the power PP of the modulated optical carrier supplied by the modulator 2, this graph constituting the power operating characteristic for the modulator 2;

the graph as a function of time t of the envelope PPM of the power of the modulated optical carrier supplied by the modulator 2 when the signal SMF is applied to its control input; and the graph as a function of the value Ve of the phase θ of the modulated optical carrier supplied by the modulator 2, this graph constituting the phase operating characteristic of the modulator 2.

The amplified and filtered modulation signal SMF is a conventional duobinary signal. It is 0-centered. Its minimal value is −a, its maximal value is +a and it assumes two intermediate values −ε and +ε which are near 0. The Mach-Zehnder modulator 2 is biased so that it does not produce any frequency modulation and so that the graph PP (the power operating characteristic) has a V-shape symmetrical to an axis corresponding to the value Ve=0. This characteristic is stabilized by conventional means to prevent drift. Each branch of the graph PP has a monotonous slope between 0 and a maximal value M. The filtered modulation signal SMF is amplified by the amplifier 6 to an amplitude value a such that the carrier power at the output of the modulator 2 is between 0 and M' where M' is a value slightly less than or equal to M.

When the amplified and filtered modulation signal SMF has a positive value, the modulator 2 supplies the modulated carrier with a constant phase-shift θ1 relative to a given reference. On the other hand, when the signal SMF has a negative value the modulator 2 supplies the modulated carrier with a phase-shift θ2=θ1+180° relative to the same reference. Consequently, when the signal SMF changes from a value near +a to a value near −a, the modulator 2 causes a phase-shift of 180°.

The combination of power modulation in accordance with the graph PP and phase shifting in accordance with the graph θ is a form of amplitude modulation usually called suppressed carrier modulation.

The graph PPM of the envelope of the power of the optical carrier modulated by the signal SMF has a maximal value equal to M' and two minimal values 0 and m where m is close to 0. The photoreceiver 7 supplies an electrical signal EPP representing the envelope of the power of the received optical signal. The graph of the signal EPP is identical to the graph PPM shown in FIG. 3, in the absence of noise. It is easy to discriminate a relatively high level and a relatively low level in this graph, by comparing the values supplied by the photoreceiver 7 to a fixed reference value Ref between M' and m. The binary signal produced by such comparison reconstitutes the binary data pattern SI directly in this example.

The scope of the invention is not limited to the use of Mach-Zehnder type modulator means, because it is possible to use any modulator having a characteristic enabling amplitude modulation in combination with a phase-shift of 180°.

We claim:

1. An optical transmission method having reduced sensitivity to dispersion comprising:

coding a data pattern to be transmitted in the form of a ternary modulation signal having one of three meaningful values: a maximal value, a minimal value and an intermediate value between the maximal value and the minimal value;

modulating an optical carrier according to the values assumed by the ternary modulation signal; said modulating step including transmitting said optical carrier with:

a maximal amplitude to represent the maximal value and the minimal value of the ternary modulation signal, the phase of the modulated optical carrier being shifted approximately 180° in one case relative to the other;

a minimal amplitude to represent the intermediate value of the ternary modulation signal;

and demodulating the modulated optical carrier by discriminating two levels in a signal representing an envelope of the power of the modulated optical carrier and then deducing therefrom the data pattern transmitted.

2. A method according to claim 1 wherein coding the data pattern to be transmitted in the form of a ternary signal further comprises:

coding the data pattern in the form of a first binary signal if it is not already in this form;

coding said first binary signal in the form of a second binary signal by differential coding; and filtering said second binary signal to reduce its bandwidth and thereby obtain a ternary signal.

3. A method according to claim 1 further comprising:

coding the data pattern to be transmitted in the form of a ternary signal with three discrete levels.

4. A method according to claim 3 further comprising:

filtering the ternary signal with three discrete levels to reduce its bandwidth and thereby obtain a filtered ternary signal.

5. An optical transmission device comprising:

means for coding a data pattern to be transmitted in the form of a ternary modulation signal having one of three meaningful values: a minimal value, a maximal value and an intermediate value between the maximal value and the minimal value; and means for modulating an optical carrier according to the values assumed by the modulation signal;

wherein the optical carrier modulator means includes a modulator supplying a modulated carrier having:

(a) a maximal amplitude when the modulation signal has its maximal value or its minimal value, the phase of the modulated carrier being shifted approximately 180° in one case relative to the other; and (b) a minimal amplitude when the modulation signal has its intermediate value.

6. A device according to claim 5 characterized in that the means for coding a data pattern in the form of a ternary signal further comprises:

means for coding said data pattern in the form of a first binary signal if it is not already in this form;

means for coding said first binary signal in the form of a second binary signal by differential coding; and means for filtering said second binary signal to reduce its bandwidth and thereby to obtain a ternary signal.

7. A device according to claim 5 further comprising: the means for coding a data pattern in the form of a ternary signal codes said data pattern in the form of a ternary signal with three discrete levels if it is not already in this form.

8. A device according to claim 7 further comprises means for filtering said ternary signal by reducing its bandwidth.

9. A device according to claim 5 characterized in that the modulator means comprises a Mach-Zehnder type modulator.

10. A transmission system comprising:

a transmitter device for modulating an optical carrier with a data pattern;

an optical transmission link having a first end coupled to an output of the transmitter device;

a means for demodulating the modulated optical carrier having an input coupled to a second end of the link and supplying a signal representing an envelope of the power of said modulated optical carrier; and a comparator for comparing said signal to a reference value and deducing a binary signal representing the data pattern transmitted;

wherein said transmitter further includes means for coding said data pattern to be transmitted in the form of a ternary modulation signal having one of three meaningful values: a minimal value, a maximal value and an intermediate value between the maximal value and the minimal value; and means for modulating an optical carrier according to the values assumed by the modulation signal;

the optical carrier modulator means including a modulator supplying a modulated carrier having:

(a) a maximal amplitude when the modulation signal has its maximal value or its minimal value, the phase of the modulated carrier being shifted approximately 180° in one case relative to the other and (b) a minimal amplitude when the modulation signal has its intermediate value.

* * * * *